US006879441B1

(12) United States Patent
Mossberg

(10) Patent No.: US 6,879,441 B1
(45) Date of Patent: Apr. 12, 2005

(54) HOLOGRAPHIC SPECTRAL FILTER

(76) Inventor: Thomas Mossberg, 584 Lynnbrook Dr., Eugene, OR (US) 97404

(*) Notice: Subject to any disclaimer, the term of this patent is extended or adjusted under 35 U.S.C. 154(b) by 81 days.

(21) Appl. No.: 09/811,081

(22) Filed: Mar. 16, 2001

Related U.S. Application Data

(60) Provisional application No. 60/247,231, filed on Nov. 10, 2000, provisional application No. 60/235,330, filed on Sep. 26, 2000, provisional application No. 60/199,790, filed on Apr. 26, 2000, and provisional application No. 60/190,126, filed on Mar. 16, 2000.

(51) Int. Cl.[7] .................................................. G02B 5/18
(52) U.S. Cl. ............................. 359/569; 359/29; 385/37
(58) Field of Search .......................... 359/29, 130, 566, 359/569, 573, 575; 385/37

(56) References Cited

U.S. PATENT DOCUMENTS

| | | | |
|---|---|---|---|
| 4,140,362 A | 2/1979 | Tien ............................. | 359/19 |
| 4,387,955 A | 6/1983 | Ludman et al. ............... | 385/37 |
| 4,440,468 A | 4/1984 | Auracher et al. | |
| 4,660,934 A | 4/1987 | Akiba et al. ................... | 430/5 |
| 4,740,951 A | 4/1988 | Lizet et al. .................... | 370/3 |
| 4,743,083 A | 5/1988 | Schimpe ........................ | 385/37 |
| 4,746,186 A | 5/1988 | Nicia ............................. | 385/14 |
| 4,773,063 A | 9/1988 | Hunsperger et al. ......... | 359/130 |
| 4,786,133 A | 11/1988 | Gidon et al. ................... | 385/37 |
| 4,824,193 A | 4/1989 | Maeda et al. .................. | 359/34 |
| 4,834,474 A | 5/1989 | George et al. ................. | 359/8 |
| 4,923,271 A | 5/1990 | Henry et al. ................... | 359/130 |
| 4,938,553 A | 7/1990 | Maerz et al. ................... | 385/14 |
| 5,107,359 A | 4/1992 | Ohuchida ...................... | 359/124 |
| 5,165,104 A | * 11/1992 | Weverka ......................... | 385/7 |
| 5,195,161 A | 3/1993 | Adar et al. ..................... | 385/129 |
| 5,357,591 A | 10/1994 | Jiang et al. .................... | 385/37 |
| 5,450,511 A | 9/1995 | Dragone ........................ | 385/37 |
| 5,768,450 A | 6/1998 | Bhagavatula .................. | 385/24 |
| 5,812,318 A | 9/1998 | Babbitt et al. ................. | 359/559 |
| 5,830,622 A | 11/1998 | Canning et al. ............... | 430/321 |
| 6,011,884 A | 1/2000 | Dueck et al. ................... | 385/24 |
| 6,011,885 A | 1/2000 | Dempewolf et al. .......... | 385/34 |
| 6,137,933 A | 10/2000 | Hunter et al. .................. | 385/37 |
| 6,169,613 B1 | 1/2001 | Amitai et al. .................. | 359/15 |

FOREIGN PATENT DOCUMENTS

| | | |
|---|---|---|
| EP | 0 310 438 A1 | 4/1989 |
| GB | 2 168 215 A | 6/1986 |
| WO | WO 99/35523 A1 | 7/1999 |
| WO | WO 99/56159 A1 | 11/1999 |

OTHER PUBLICATIONS

B.A. Capron, et al., Design and Performance of a Multiple Element Slab Waveguide Spectrograph for Multimode Fiber–Optic WDM Systems., Journal of LightWave Technology, vol. 11 No. 12., Dec. 1993., IEEE Log No. 9211169, pp. 2009–2014.

(Continued)

*Primary Examiner*—Mark A. Robinson
*Assistant Examiner*—Alessandro Amari
(74) *Attorney, Agent, or Firm*—David S. Alavi; Thomas L. Evans

(57) ABSTRACT

Method and apparatus are contemplated for receiving from an input, an optical signal in a volume hologram comprising a transfer function that may comprise temporal or spectral information, and spatial transformation information; diffracting the optical signal; and transmitting the diffracted optical signal to an output. A plurality of inputs and outputs may be coupled to the volume hologram. The transformation may be a linear superposition of transforms, with each transform acting on an input signal or on a component of an input signal. Each transform may act to focus one or more input signals to one or more output ports. A volume hologram may be made by various techniques, and from various materials. A transform function may be calculated by simulating the collision of a design input signal with a design output signal.

37 Claims, 13 Drawing Sheets

OTHER PUBLICATIONS

R.J. Deri, et al., Quantitative Analysis of Integrated Optic Waveguide Spectrometers., IEEE Photonics Technology Letters, vol. 6, No. 2, Feb. 1994., pp. 242–244.

A. Grunnet–Jepsen, et al., Fibre Bragg grating based spectral encoder/decoder for lightwave CDMA. Electronics Letters vol. 35., No. 13., Jun. 24th, 1999., pp. 1096–1097.

P.Paddon and Jeff F. Young, Simple approach to coupling in textured planar waveguides, Optical Society of America 1998, vol. 23, No. 19. pp. 1529–1531.

C.K. Madsen, et al., Planar Waveguide Optical Spectrum Analyzer Using a UV–Induced Grating, IEEE Journal of selected topics in quantum electronics, vol. 4, No. 6, Nov. 1998, pp. 925–929.

Emilio Gini, et al., Polarization Independent InP WDM Multiplexer/Demultiplexer Module., Journal of Lightwave Technology, vol. 16, No. 4., Apr. 1998, pp. 625–630.

Robert W. Day, et al., Filter–Response Line Shapes of Resonant Waveguide Gratings., Journal of Lightwave Technology. vol. 14, No. 8, Aug. 1996., pp. 1815–1824.

K.A. McGreer., Tunable Planar Concave Grating Demultiplexer., IEEE Photonics Technology Letters, vol. 8. No. 4, Apr. 1996., pp. 551–553.

Suning Tang, et al., A Novel Wavelength–Division–Demultiplexer with Optical In–Plane to Surface–Normal Conversion., IEEE Photonics Technology Letters, vol. 7, No. 8, Aug. 1995.

K.A. McGreer, Diffraction from Concave Gratings in Planar Waveguides., IEEE Photonics Technology Letters, vol. 7. No. 3, Mar. 1995., pp. 324–326.

Hirokazu Takenouchi, et al., Analysis of optical–signal processing using an arrayed–waveguide grating., Optics Express, vol. 6, No. 6, Mar. 13, 2000., pp. 124–135.

A.Grunnet–Jepsen, et al., Demonstration of All–Fiber Sparse Lightwave CDMA Based on Temporal Phase Encoding., Photonics Technology Letters, vol. 11 No. 10, Oct. 1999.

Randall Babbitt, et al., Optical waveform processing and routing with structured surface gratings., Optics Communications 148, 1998., pp. 23–26.

Gerald A. Brigham, et al., Analysis of scattering from large planar gratings of compliant cylindrical shells., Acoust Society of America, vol. 61, No. 1, Jan. 1977. pp. 48–59.

T.Kurokawa, et al., Time–space–conversion optical signal processing using arrayed–waveguide grating., Electronics Letters vol. 33, No. 22, Oct. 23, 1997. pp. 1890–1891.

Aasmund Sv. Sudbo, et al., Reflectivity of Integrated Optical Filters Based on Elliptic Bragg Reflectors., Journal of Lightwave Technology vol. 8, No. 6, Jun. 1990. pp. 998–1006.

Charles H. Henry., Four–Channel Wavelength Division Multiplexers and Bandpass Filters Based on Elliptical Bragg Reflectors., Journal of Lightwave Technology vol. 8. No. 5, May 1990 IEEE., pp. 748–755.

E.M. Koontz, et al., Preservation of rectangular–patterned InP gratings overgrown by gas source molecular beam epitaxy., Appl. Phys. Lett vol. 71, No. 10, Sep. 1997., pp. 1400–1402.

Seok Ho Song, et al., Focusing–grating–coupler arrays for uniform and efficient signal distribution in a backboard optical interconnect., Optical Society of America 1995., Applied Optics vol. 34, No. 26., Sep. 10, 1995., pp. 5913–5919.

John C. Brazas, et al., Analysis of input–grating couplers having finite lengths., Applied Optics vol. 34, No. 19., Jul. 1, 1995., pp. 3786–3792.

Keith A. Bates, et al., Gaussian beams from variable groove depth grating couplers in planar waveguides., Applied Optics vol. 32, No. 12., Apr. 20, 1993., pp. 2112–2116.

S.S. Wang, et al., Theory and applications of guided–mode resonance filters., Applied Optics vol. 32 No. 14., May 10, 1993., pp. 2606–2613.

R. Magnusson, et al., New Principle for optical filters., American Institute of Physics 1992., Appl. Phys. Lett. vol. 61, No. 9., Aug. 31, 1992., pp. 1022–1024.

S.M. Ojha, et al., Demonstration of low loss integrated InGaAsP/InP demultiplexer device with low polarisation sensitivity., Electronics Letter vol. 29, No. 9., Apr. 29, 1993.

Lifeng Li., Analysis of planar wavegide grating couplers with double surface corrugations of identical period., 1995 Elsevier Science B.V., Optics Communications 114., pp. 406–412.

J.B.D. Soole, et al., High speed monolithic WDM detector for 1.5 um fibre band., Electronics Letters vol. 31., No. 15., Jul. 20, 1995., pp. 1276–1277.

J.T. Rantala, et al., Sol–gel hybrid glass diffractive elements by direct electron–beam exposure., El ctronics Letters vol. 34., No. 5., Mar. 5, 1998., pp. 455–456.

M.A. Cowin, et al., Compact polymeric wavelength division multiplexer., Electronics Letters vol. 35., No. 13., Jun. 24, 1999., pp. 1074–1076.

J. Canning, et al., Grating structures with phase mask period in silica–on–silicon planar waveguides., 1999 Elsevier Science B.V., Optics Communications 171., pp. 213–217.

P.K. Tien, et al., Use of concentric–arc grating as a thin–film spectrograph for guided waves., 1980 American Institute of Physics., pp. 524–525.

Akimasa Kaneko, et al., Design and Applications of Silica–Based Planar Lightwave Circuits., IEEE Journal of selected topics in quantum electronics vol. 5., No. 5., Sep./Oct. 1999., pp. 1227–1236.

Z. J. Sun, et al., Demultiplexer with 120 channels and 0.29–nm channel spacing., IEEE Photonics Technology Letters, vol. 10, No. 1., Jan. 1998., pp. 90–92.

C.K. Madsen, et al., Planar waveguide optical spectrum analyzer using a UV–induced grating., IEEE Journal of selected topics in quantum electronics., vol. 4, No. 6., Nov./Dec. 1998., pp. 925–929.

Ivan A. Avrutsky, et al., Multiwavelength diffraction and apodization using binary superimposed gratings., IEEE Photonics Technology Letters, vol. 10, No. 6, Jun. 1998., pp. 839–841.

A.T. Alavie, et al., A Multiplexed bragg grating fiber laser sensor system., IEEE Photonics Technology Letters, vol. 5, No. 9, Sep. 1993., pp. 1112–1114.

Xiaoli Fu, et al., 1×8 supergrating wavelength–division demultiplexer in a silica planar waveguide., 1997 Optical Society of America., Optics Letters vol. 22, No. 21., pp. 1627–1629.

M.R. Wang, et al., Five–channel polymer waveguide wavelength division demultiplexer for the near infrared., IEEE Photonics Technology Letters, vol. 3. No. 1., Jan. 1991., pp. 36–38.

Michael R. Wang, et al., Wavelength–division multiplexing and demultiplexing on locally sensitized single–mode polymer microstructure waveguides., 1990 Optical Society America, Optics Letters vol. 15, No. 7., Apr. 1, 1990, pp. 363–365.

Chunmeng Wu, et al., Simplifi d coupl d–wav quations for cylindrical wav s in circular grating planar wav guides., Journal of Lightwave Technology, vol. 10, No. 11, Nov. 1992., pp. 1575–1589.

Louay Eldada, et al., Dispersive properties of planar polymer bragg gratings., IEEE Photonics Technology Letters, vol. 12, No. 7, Jul. 7, 2000., pp. 819–821.

Ray T. Chen, et al., Guided–wave planar optical interconnects using highly multiplexed polymer waveguide holograms., Journal of Lightwave Technology, vol. 10, No. 7, Jul. 1992., pp. 888–897.

V. Minier, et al., Diffraction characteristics of superimposed holographic gratings in planar optical wav guid s., IEEE Photonics Technology Letters, vol. 4, No. 10, Oct. 1992.

Tetsuo Miya, Silica–based planar lightwave circuits: passive and thermally active devices., IEEE Journal of selected topics in quantum electronics, vol. 6, No. 1, Jan./Feb. 2000., pp. 38–45.

Johan Backlund, et al., Multifunctional grating couplers for bidirectional incoupling into planar waveguides., IEEE Photonics Technology Letters, vol. 12, No. 3, Mar. 2000., pp. 314–316.

D. Wiesmann, et al., Apodiz d surface–corrugated gratings with varying duty cycles., IEEE Photonics Technology Letters, vol. 12, No. 6, Jun. 6, 2000., pp. 639–641.

Shogo Ura, et al., "Integrated Optic Wavelength Demultiplexer Using a Coplanar Grating Lens", Applied Optics, Mar. 20, 1990, pp. 1369–1373, vol. 29, No. 9, Optical Society of America, New York, USA.

Ray T. Chen, et al., "Ten Channel Single–Mode Wavelength Division Demultiplexer in Near IR", Integrated Optical Circuits, Sep. 3, 1991, pp. 134–142, vol. 1583, The International Society for Optical Engineering, Boston, Massachusetts, USA.

W. R. Babbit, et al., "Spatial Routing of Optical Beams Through Time–Domain Spatial–Spectral Filtering", Optics Letters, Apr. 15, 1995, pp. 910–912, vol. 20, No. 8, Optical Society of America, USA.

T. W. Mossberg, "Planar Holographic Optical Processing Devices", Optics Letters, Apr. 1, 2001, pp. 414–416, vol. 26, No. 7, Optical Society of America, USA.

Brady, D.J. et al., "Holographic Interconnections in Photorefractive Waveguides," Applied Optics, Jun. 10, 1991, vol.30, No. 17, 10 pgs.

Preston, K., Jr., "Digital Holographic Logic," Pattern Recognition, vol. 5, 1973, pp. 37–49.

* cited by examiner

HOLOGRAPHIC SPECTRAL FILTER

This U.S. patent application claims the benefit of U.S. Provisional Application No. 60/190,126, filed Mar. 16, 2000, and of U.S. Provisional Application No. 60/199,790 filed Apr. 26, 2000, and of U.S. Provisional Application No. 60/235,330 filed Sep. 26, 2000, and of U.S. Provisional Application No. 60/247,231 filed Nov. 10, 2000.

FIELD

The field of interest is optical signal processing.

BACKGROUND

Spectral filtering is a very useful optical function that can be utilized to control the temporal waveform of pulsed optical signals, cross-correlate or otherwise process optical signals, and to differentially control and manipulate spectrally-distinguished optical communication channels, as found for example in wave-division-multiplexed (WDM) optical communication systems. Devices have been introduced over the years to perform spectral filtering, all of which have characteristic shortcomings along with their strengths. In many cases these shortcomings, including limited spectral resolution, alignment sensitivity, fabrication difficulties, high cost, and lack of flexibility, have prevented widespread application.

A spectral filtering device, according to the present usage, is a device that applies a fixed or dynamically re-programmable, complex-valued, spectral transfer function to an input signal. If $E_{in}(\omega)$ and $E_{out}(\omega)$, respectively, represent Fourier spectra of input and output signals, computed on the basis of the time-varying electric fields of the two signals, and $T(\omega)$ is a complex-valued spectral transfer function of modulus unity or smaller, the effect of the spectral filtering device (also called an optical processing device, OPD) can be represented as $$E_{out}(\omega) = T(\omega) E_{in}(\omega) \qquad (1)$$

The transfer function $T(\omega)$ has an overall width $\Delta_\omega$ and a resolution width $\Delta_r$, where the latter quantity is the minimum spectral interval over which $T(\omega)$ displays variation (see FIG. 1), and is a significant measure of the transformation ability of a spectral filtering device. The physical characteristics of a particular spectral filtering device determine the range and types of spectral transfer functions that it can be configured to provide. We limit our discussion here to spectral filtering devices that act to apply a fully coherent transfer function, i.e. the device fully controls the amplitude and phase shifts applied to the input signal spectrum, except for an overall phase factor.

Spectral filtering devices can be utilized to transform input signals from one format into another, or to tailor their spectra to some preferred form. A spectral filtering device, according to the present usage, may or may not have the additional capacity to transform the spatial wavefront of input optical signals.

As a special case, if $T(\omega)$ is set equal to the conjugate Fourier spectrum $E_{ref}(\omega)$ of a reference temporal waveform, also called the design temporal waveform, the output field from the spectral filtering device is proportional to the cross-correlation of the input field with the reference temporal waveform. Temporal cross-correlation capability is widely useful in temporal pattern recognition.

The capabilities of a spectral filtering device can be utilized in multiple ways in communications systems, including signal coding and decoding for Code-Division Multiplexing (CDM), optical packet recognition, code-based contention resolution, as WDM multiplexers and demultiplexers, and as WDM add/drop multiplexers. FIG. 2 depicts the encoding and decoding of optical signals in a CDM context. Data 202 is input through a first communication channel, and data 206 is input through a second communication channel. Data 202 passes through a spectral filter 204, which encodes data 202 with an identifying code. Similarly, data 206 is encoded with an identifying code by a spectral filter 208. The encoded signals are combined and transmitted over an optical transmission line 210. At their destination the encoded signals are split into two paths, 212 and 214. The upper path 212 feeds into a spectral filter 216, which imparts a transfer function that is the conjugate transfer function of the filter 204. The output of spectral filter 216 is a signal comprising the superposition of data 202 and data 206; however, due to the encoding imparted by spectral filters 204 and 208 and subsequent decoding by spectral filter 216, this output signal contains a component 218 originating from 202 that has a specific recognizable temporal waveform, typically comprising a brief high power peak for each bit transmitted, along with a component 220 originating from data 206. In the upper path, the component originating from data 206 has a temporal waveform structure that can be discriminated against in detection. Typically, component 220 has no brief high power peak.

In similar fashion, the lower branch 214 feeds into a spectral filter 222, the output of which is a signal made up of the superposition of a component 224 originating from data 206, and a component 226 originating from signal 202. As before, the two signal components have distinguishable temporal waveforms, with the component from data 206 typically having a brief detactable high power peak while the component from data 202 lacking the brief high power peak, and hence remaining below a detection threshold. A key element in CDM detection is the implementation of thresholding in the detection scheme that can distinguish input pulses of differing temporal waveform character.

A variety of other CDM methods are known and, many of them having need for high performance spectral filtering devices. Some alternative CDM approaches operate entirely with spectral coding. Different applications for high performance spectral filtering devices exist. For example, spectral filtering devices capable of accepting multiple wavelength-distinguished communication channels through a particular input port, and parsing the channels in a predetermined fashion to a set of output ports, i.e., a WDM demultiplexer, have wide application. This is especially true if the spectral filtering device is capable of handling arbitrary spectral channel spacing with flexible and controllable spectral bandpass functions.

A widely known approach to implementing coherent spectral filtering is a dual-grating, free-space optical design, shown schematically in FIG. 3. Gratings 302 and 310 are periodic, with grooves of constant spacing and amplitude. A first grating 302 spectrally disperses an input signal, providing a mapping of frequency-to-position along the x-direction of the filter plane. A lens 304 directs the signal to a planar phase and/or amplitude mask 306, varying in the x-direction, with $\Delta_r$ representing the minimum spectral width over which the mask exhibits variation. A second lens 308 directs the output of the mask 306 to a second grating 310, which accepts the filtered spectral components that have passed through the mask 306, and maps them onto a common output direction.

The dual-grating, free-space spectral filtering device has limited appeal in the context of communication systems because of its physical complexity, sensitivity to precision alignment, relatively large insertion loss, and limited spectral resolution for gratings of tractable physical dimensions. In the dual-grating spectral filter described above, the gratings act only to apply and invert an angle-to-space mapping; no information specific to the transfer function to be imparted resides in the gratings. The mask 306 is necessary to impart the transfer function.

There is another class of spectral filters wherein the entire spectral filtering function is effected through diffraction from a single diffractive structure, having diffractive elements whose diffractive amplitudes, optical spacings, or spatial phases vary along some design spatial dimension of the grating. Diffractive elements correspond, for example, to individual grooves of a diffraction grating, or individual periods of refractive index variation in a volume index grating. Diffractive amplitude refers to the amplitude of the diffracted signal produced by a particular diffraction element, and may be controlled by groove depth, magnitude of refractive index variation, magnitude of absorption, or other quantity, depending on the specific type of diffractive elements comprising the diffractive structure under consideration. Optical separation of diffractive elements refers to the optical path difference between diffractive elements. Spatial phase refers to the positioning as a function of optical path length of diffractive elements relative to a periodic reference waveform. The spatial variation of the diffractive elements encodes all aspects of the transfer function to be applied. We refer here to diffractive structures whose diffractive elements (grooves, lines, planes, refractive-index contours, etc.) possess spatial variation representative of a specific spectral transfer function using the term "programmed." Programmed diffractive structures, i.e. those whose diffraction elements possess spatial structure that encodes a desired spectral transfer function, have only been previously disclosed in the case of surface relief gratings, and in fiber gratings whose diffractive elements correspond to lines (or grooves) and constant index planes, respectively. Programmed diffractive structures known in the art do not provide for the implementation of general wavefront transformations simultaneously with general spectral transformations.

Programmed surface gratings and programmed fiber gratings are encumbered with severe functional constraints. A programmed surface-grating filter has a fundamentally low efficiency, and requires alignment sensitive free-space optical elements to function. Programmed fiber-grating filters produce output signals that are difficult to separate from input signals (since they can only co- or counterpropagate), and can only support a single transfer function within a given spectral window.

In 1998, Babbitt and Mossberg [(Opt. Commun. 148, 23 (1998)] introduced a programmed surface-grating filter, either reflective or transmissive, whose diffractive elements (straight grooves) exhibit spatial structure, i.e., variations in diffractive amplitude, optical separation, or spatial phase, in the direction perpendicular to their length. A free-space implementation 400 of this device is schematically represented in FIG. 4. The diffractive elements (grooves) of the programmed surface-grating filter extend uniformly normal to the plane of the figure, while the diffractive amplitude, spatial separation, and/or spatial phase of the diffractive elements varies with position along the x-direction. A programmed surface-grating device can be produced by a variety of fast and economical processes such as by stamping, lithography, or masking processes. However, programmed surface-grating filters have a very serious deficiency in their intrinsically low efficiency. The profile of a programmed surface grating can be thought of as an assemblage of sine gratings, each of which maps one spectral component of the input signal to the output direction. Since the surface diffraction condition constrains only the surface projection of the input and output wavevectors, however, each constitutive sine grating interacts with all spectral components of the input beam, diffracting all but its design component into discarded output directions. As a result, the higher the complexity of the programmed transfer function (and therefore, the more sine components needed to describe it), the lower the efficiency of the programmed surface grating filter.

Fiber Bragg gratings, such as 502 illustrated in FIG. 5, have become an accepted component in optical communications systems. Programmed fiber Bragg gratings have been disclosed, and provide for higher efficiency and easier implementation than programmed surface gratings. Programmed fiber-grating filters are implemented in fiber links in the same manner as ordinary fiber-grating devices, typically using a circulator 504. Programmed fiber Bragg filters are useful, but have significant limitations. A primary drawback is that there is only one input direction 506 and one output direction 508, those directions being antiparallel (transmitted signals are not often employed.) This means that a given programmed fiber-grating filter can be configured to produce only a single transfer function in a specific spectral region. Furthermore, a circulator 504, used to separate input and output signals is costly, and adds complexity to the overall device. Finally, programmed fiber Bragg gratings are time-consuming and labor-intensive to fabricate. The transfer function is typically imparted to the material via varying the material's index of refraction along the length of the fiber. Fabrication typically requires complex masking and high power ultraviolet exposure for extended time periods, or complicated ultraviolet holographic exposure apparatus with long exposure times.

There have been filters disclosed comprising systems of uniform diffractive elements, that offer the capability of applying a specific type of spatial wavefront transformation to input signals, but that do not possess the capability of implementing general spatial or spectral transformations. Spatial wavefront transformation capability enhances the capability of the device to accept signals from input ports and map them to outputs ports, without the aid of the auxiliary devices to effect needed spatial wavefront transformations.

There remains a need in the art for spectral filtering devices that offer all of the following features: low cost fabrication, low insertion loss (high efficiency), fully integrated design with no free-space optics, general spatial wavefront transformation capability, general spectral transformation capability, and multiport operation with capability of distinct spectral/temporal and spatial transfer functions connecting operative port pairs.

SUMMARY

Method and apparatus are disclosed for receiving from an input an optical signal in a volume hologram comprising a plurality of diffractive elements comprising temporal and/or spectral transformation information and may also comprise spatial transformation information; diffracting the optical signal via the diffractive elements producing a diffracted optical signal; and producing an output comprising the diffracted optical signal.

DETAILED DESCRIPTION OF THE INVENTION

The present invention contemplates a new class of spectral filtering devices, which we refer to as programmed holographic spectral filtering devices, or more simply and interchangeably as programmed holographic devices or programmed holographic processors. These spectral filtering devices are free of the shortfalls of previous spectral filtering devices, and yet provide low cost, high performance functionality. Programmed holographic devices comprise volume holograms in substrates that may comprise planar waveguides, bulk materials, or other substrates, whose diffractive elements have spatial variations in amplitude, optical spacing, or spatial phase, whose detailed form dictates the transfer function produced by the device. A volume hologram is a diffractive structure operative to generate output optical signals in response to input optical signals, wherein each portion of the wavefront of the input signal contributes to the output signal by scattering from the diffractive structure as it propagates through the structure over a distance large enough so that retardation effects within the diffractive structure significantly influence the form of the output signal. A volume hologram contrasts with a surface or thin hologram as follows: for a volume hologram, each portion of the input signal wavefront contributes to the output signal due to scattering by a diffractive structure distributed on and within a volume; for a surface or thin hologram, each portion of the input signal wavefront contributes to the output signal only by scattering from a thin layer of diffractive structure.

Filtering devices after the present invention provide for the control and modification of temporal, spectral, and spatial properties of input optical signals. The present invention comprises a spectral filtering device whose advantages include:

high efficiency, even when high-complexity transfer functions are required;

ability to impart general spectral transfer functions;

multiple input and output ports which are spatially separate from one another, thus eliminating the need for costly components such as circulators;

fast and economical fabrication through stamping, lithographic, or masking processes operative on an external surface;

ability to accept input signals with general planar or curved spatial wavefronts and transform them upon diffraction to other general planar or curved spatial wavefronts so as to match needed input and output wavefront parameters and eliminate separate wavefront conditioning components; and capability for providing multiple spectral/temporal transfer functions in a single device.

Figure 1:
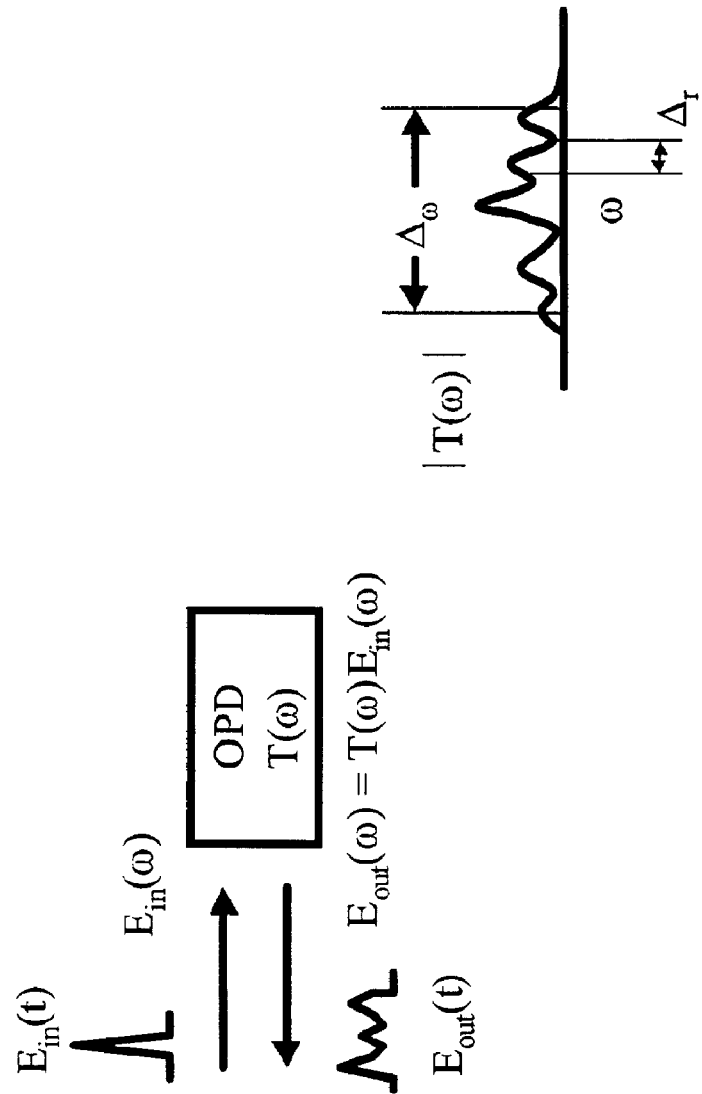
FIG. 1 (prior art) shows an input signal $E_{in}(t)$ accepted by a spectral filtering device comprising a transfer function $T(\omega)$, and a processed output signal $E_{out}(t)$.
Figure 2:
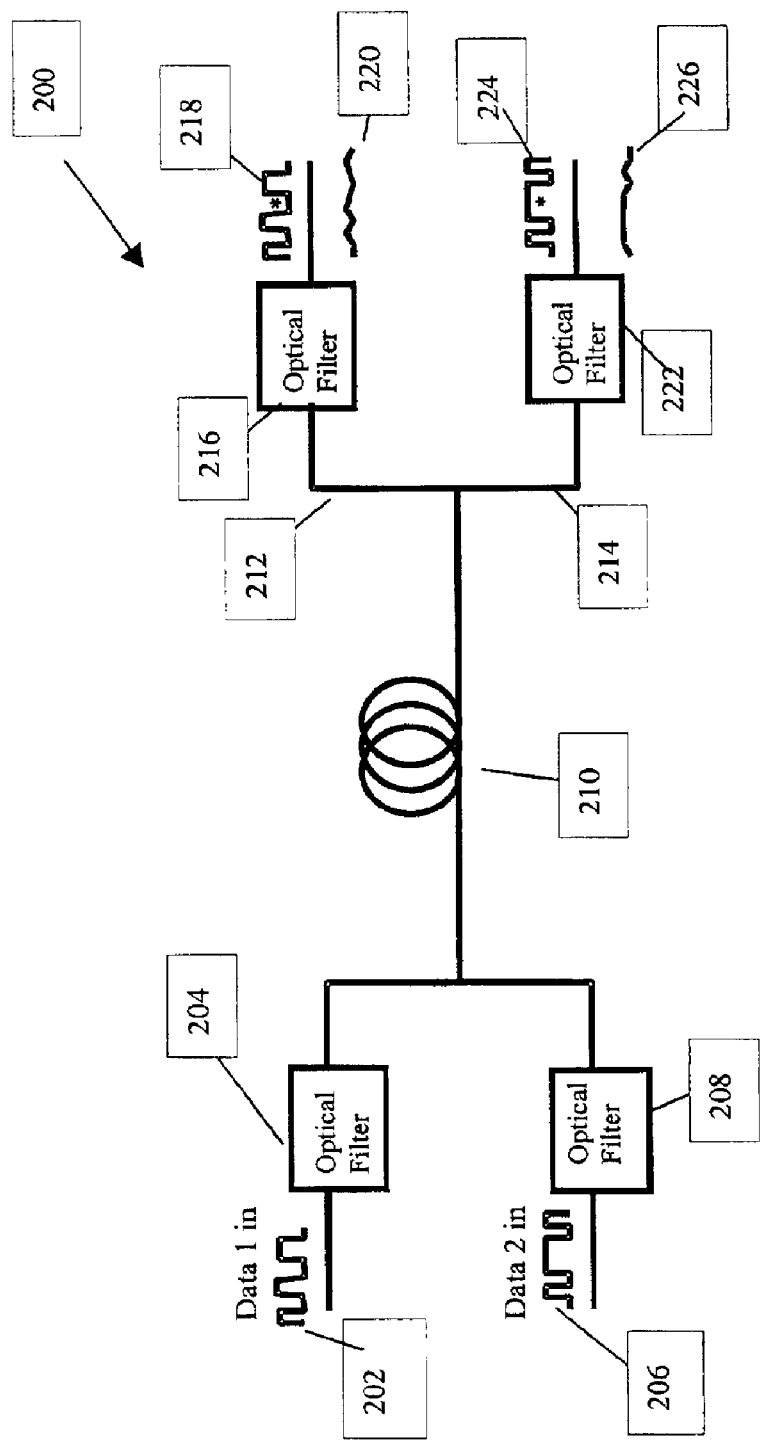
FIG. 2 (prior art) shows data input from two sources, applying a spectral filter to each input, transmission and subsequent decoding.
Figure 3:
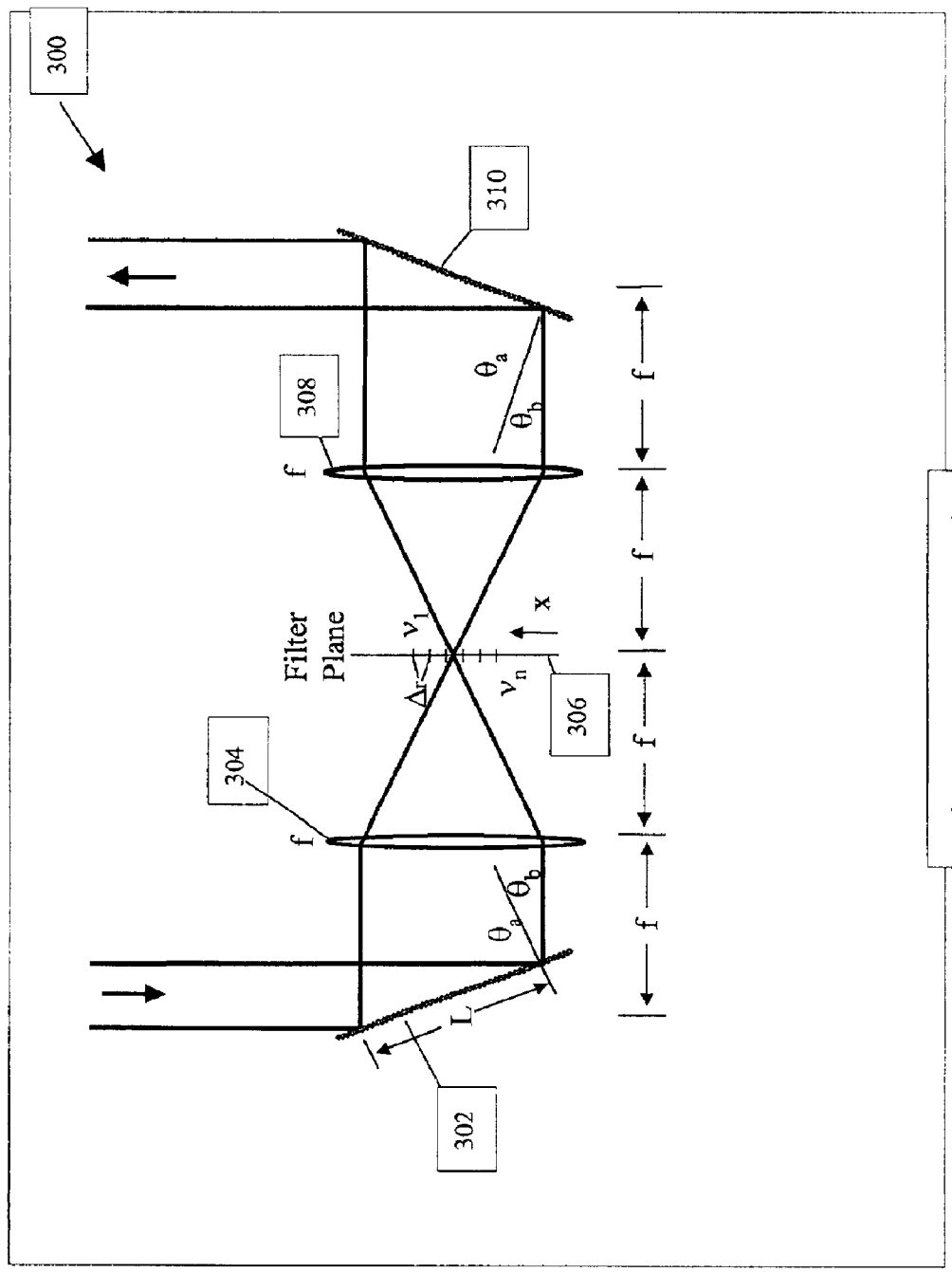
FIG. 3 (prior art) shows a dual-grating, free-space spectral filter design.
Figure 4:
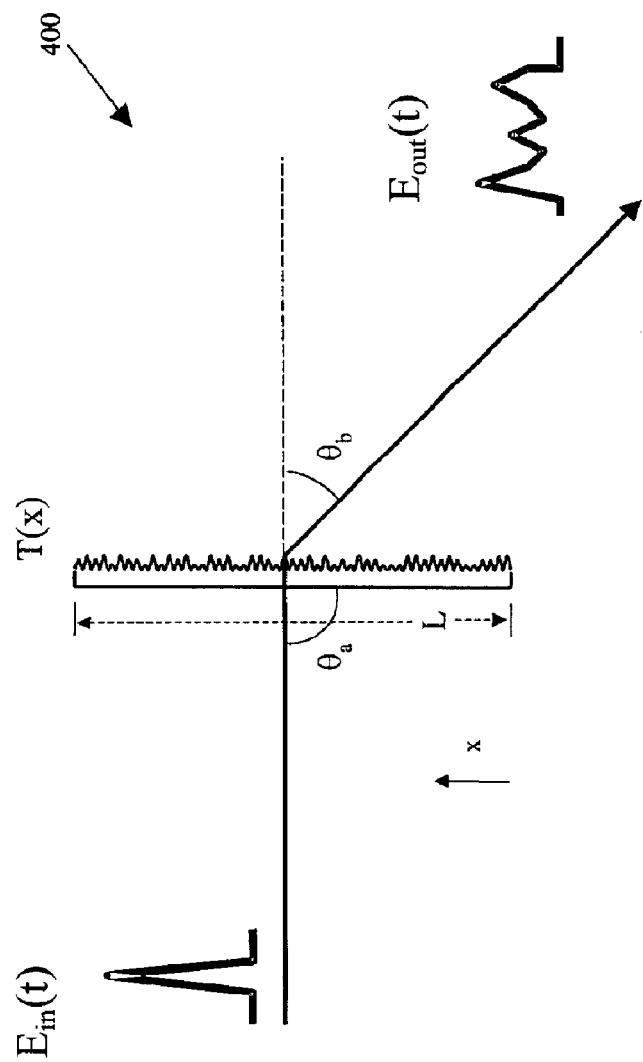
FIG. 4 (prior art) shows a programmed surface-grating spectral filtering device.
Figure 5:
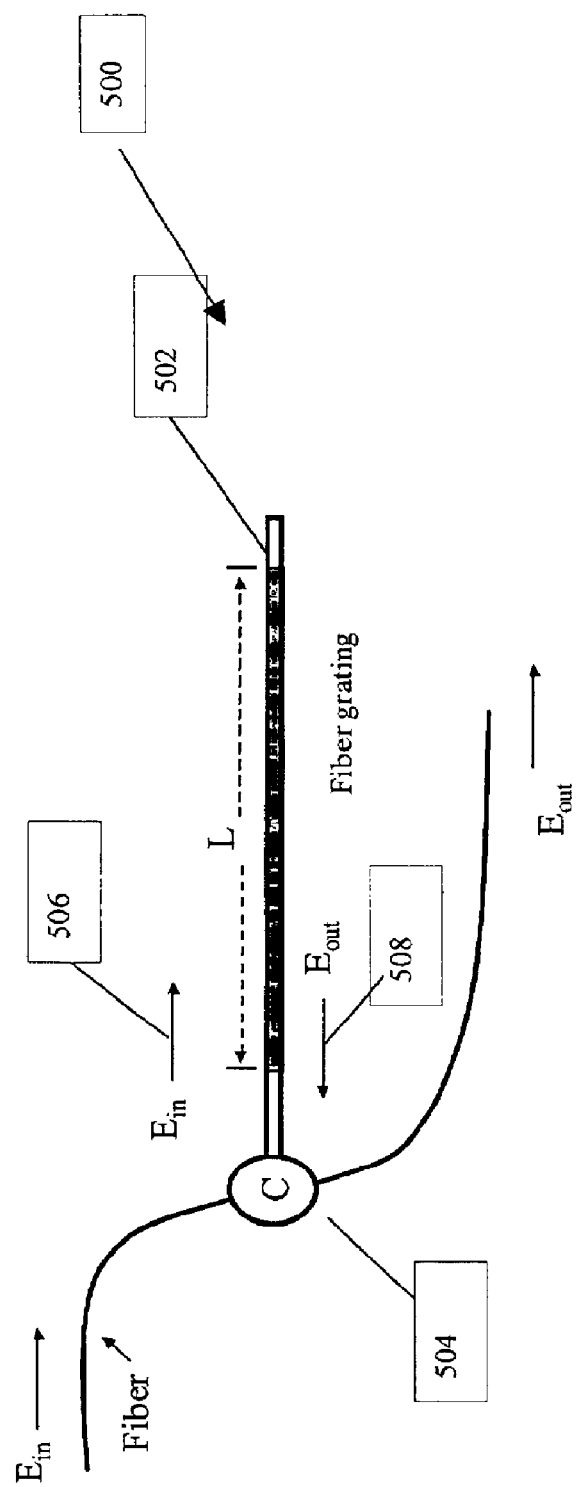
FIG. 5 (prior art) shows a programmed fiber-Bragg grating spectral filtering device.
Figure 6:
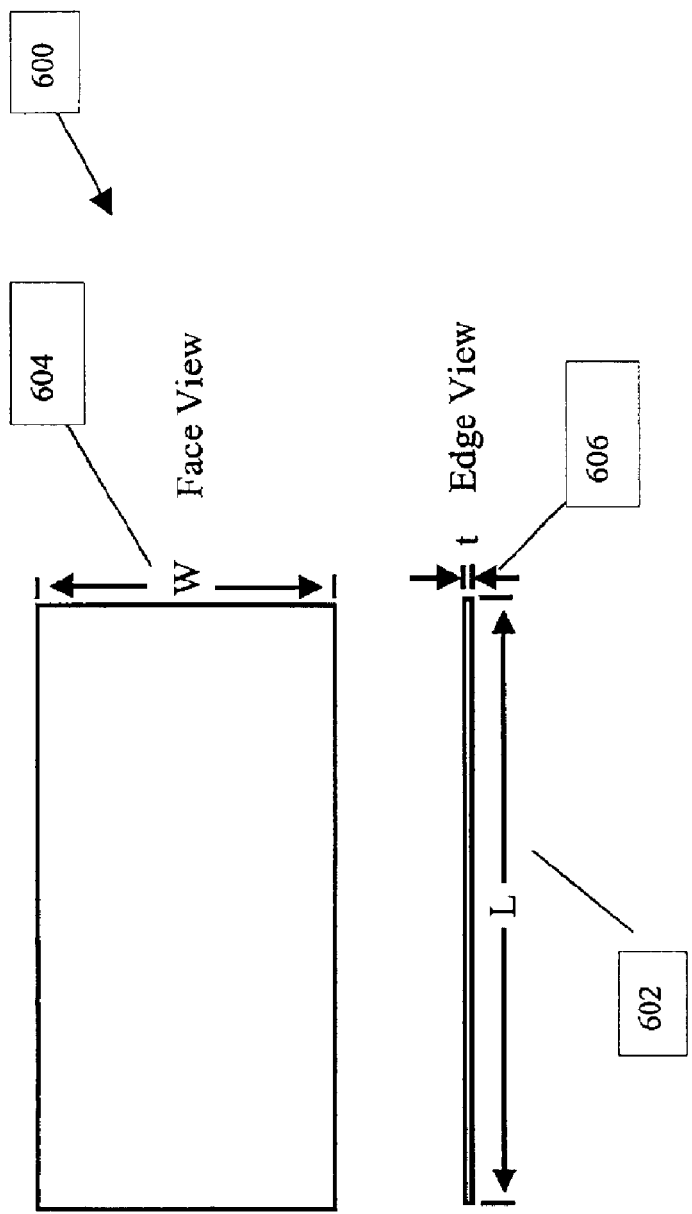
FIG. 6 shows the basic geometry of a planar waveguide appropriate to contain a programmed planar holographic spectral filtering device, according to one embodiment of the invention.

In one embodiment, shown in FIG. 6, a programmed holographic device comprises a thin planar slice of substrate material having millimeter-to-centimeter-scale extent in the x- and y-directions (i.e. length and width dimensions of the planar surface), and a micron-scale extent in the z-direction (i.e. the thickness dimension of the planar slice). The extent 602 in the x-direction is of length L, the extent 604 in the y-direction is of width W, and the extent 606 in the z-direction is of thickness t. Input and output signals propagate within the planar holographic substrate in the x-y plane. The planar holographic substrate, or slab, is typically constructed of a material sufficiently transparent at the intended operational wavelength of the device so that unacceptable loss does not accrue from absorption as signals propagate through the programmed holographic device. Typical substrate materials include silica ($SiO_2$), which is transmissive over much of the visible and near infrared spectral region; polymers; and silicon. Many materials capable of supporting volume holograms are known; any of these may be utilized as a substrate material for programmed holographic devices. The thickness of the planar substrate is preferably set to a value small enough to ensure that only a relatively small number of transverse (z) modes are allowed, or more specifically, that allowed transverse (z) modes do not experience significant modal dispersion on passing through the programmed holographic device. Stated another way, the maximal transit-time difference between supported z-modes is preferably substantially less than the temporal resolution that the programmed holographic processor is designed to provide. Yet another description of the preferred thickness is that the inverse of the maximal transmit-time difference between supported z-mode is substantially less than the spectral resolution that the programmed holographic reflector is designed to support.

It is also preferable that modal propagation speeds of the planar modes significantly utilized by the device do not change significantly over the operative spatial extent of the programmed holographic structure. Raw substrates are preferably controlled to have refractive index and thickness homogeneity sufficient so that substrate modes accumulate a positional displacement of substantially less than one wavelength of light at the operative frequency, relative to a constant speed reference on passing from end-to-end through the operative programmed holographic structure. Variations in substrate thickness and index of refraction are completely acceptable in those instances where they are known and can be accounted for in the design of the programmed holographic structure.

Figure 7:
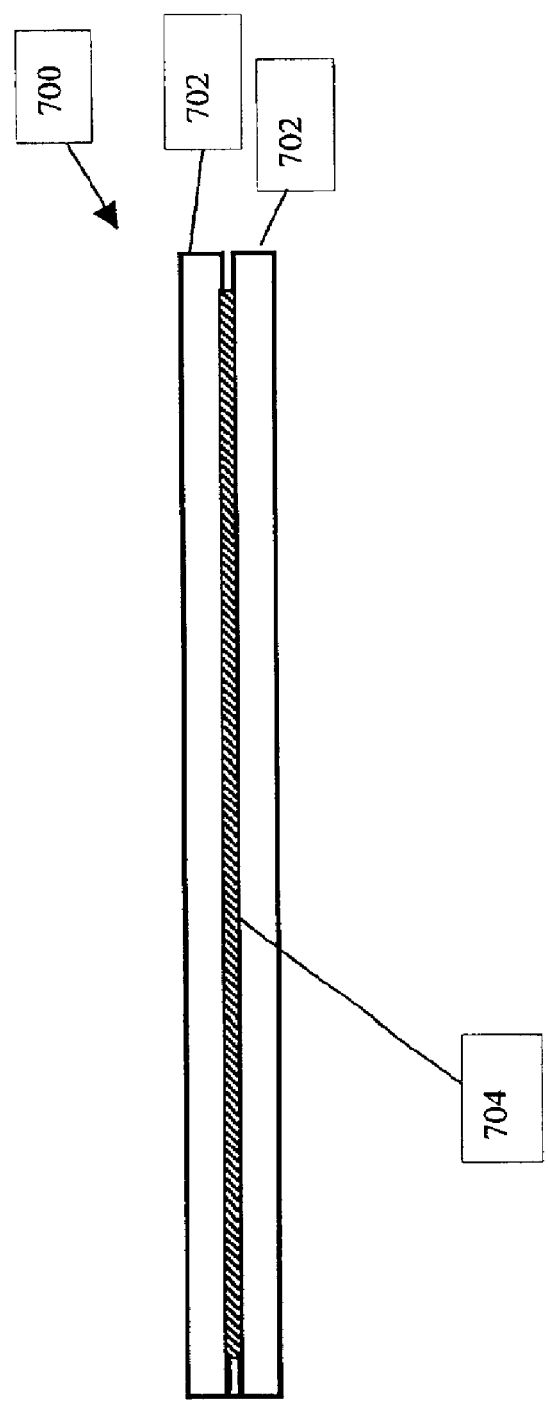
FIG. 7 shows a substrate for a programmed planar holographic spectral filtering device, mounted between support slabs, according to one embodiment of the invention.

Mechanical stability of the planar holographic substrate is typically enhanced when it is attached on one or both sides to support slabs 702, as shown in FIG. 7. Support slabs may be any dielectric whose index of refraction is suitably different from that of the holographic substrate, to ensure that at least one optical mode is primarily confined to propagate within the holographic substrate. Support slabs of metal may also be considered although some absorptive losses will accure. Optical signals may be coupled into/out of a planar substrate 704 comprising the programmed hologram structure, via integrated optical waveguides or fibers (not shown) coupled to the edge of the substrate, or via prism coupling (not shown) in and/or out along the planar face(s) of the substrate. Waveguide or fiber inputs and outputs coupled to the edge of the substrate may be supported by an attachment strip along portions of the periphery of the planar substrate 704 between the support slabs 702.

The programmed holographic structure comprising the diffracting elements which effects the designed spectral, temporal, and/or spatial filtering, situated on or within the holographic substrate, may be take a variety of embodiments, with corresponding fabrication methods.

The diffractive elements may comprise profile variations in the planar boundary of a planar waveguide. In one embodiment, one or both faces of the substrate, (preferably only one), is etched by photolithographic, e-beam, or other standard surface etching means known in the art, to produce, e.g., a surface depth profile (depth here is defined as the deviation of the local substrate surface from the average surface level), or, e.g., a refractive index profile comprising from the original substrate refractive index value, whose spatial structure comprises the diffractive elements of the programmed holographic structure.

In another embodiment, one or both slab faces may be deformed by the application of a stamp or other mechanism, whose surface relief has the spatial structure of the desired programmed holographic structure. In yet another embodiment, a thin deformable dielectric layer, with thickness on the order of one micron, may be deposited on one or both faces of the substrate, followed by deformation of the thin dielectric layer(s) by. e.g., a stamp or other mechanism whose surface relief has the spatial structure of the desired programmed holographic structure. It is to be noted that the similarity in refractive index between the thin dielectric layer and the substrate is important. For a fixed surface relief geometry derived from deformation of an overlayer, the coupling between input and output signals tends to be enhanced when the difference in refractive index of the overlayer and holographic substrate is minimized. More generally, control of the difference in refractive index between overlayer and holographic substrate provides for control over the input-output signal coupling strength.

In yet another embodiment, a metallic or dielectric layer whose surface relief has the spatial structure of the desired programmed holographic structure may be deposited on one or both of the grating slab faces. In yet another embodiment, one or both support slabs whose surface relief has the spatial structure of the desired programmed holographic structure, may be pressed securely against the substrate, and preferably bonded. In yet another embodiment, a planar substrate exhibiting photosensitivity leading to index or absorptive changes, may be exposed to writing optical fields propagating within the substrate and having the characteristics of the design optical fields described below. In yet another embodiment, a planar substrate exhibiting photosensitivity leading to index or absorptive changes, may be exposed, via contact or projection imaging, to an optical writing field whose spatial intensity pattern within the substrate conveys the spatial structure of the desired programmed holographic structure.

Additionally, there exist a large number of methods known in the art for applying approximately periodic structures to the surfaces or interiors of substrate materials, including but not limited to lithography/etch, electron beam lithography, abrasive material removal techniques, laser ablation, photolithography, mechanical ruling, masking, stamping, pressing. Use of any of these methods to make volume holograms that apply dielectric perturbations to optical waves propagating within the holographic substrate falls within the scope and spirit of this invention.

Figure 8:
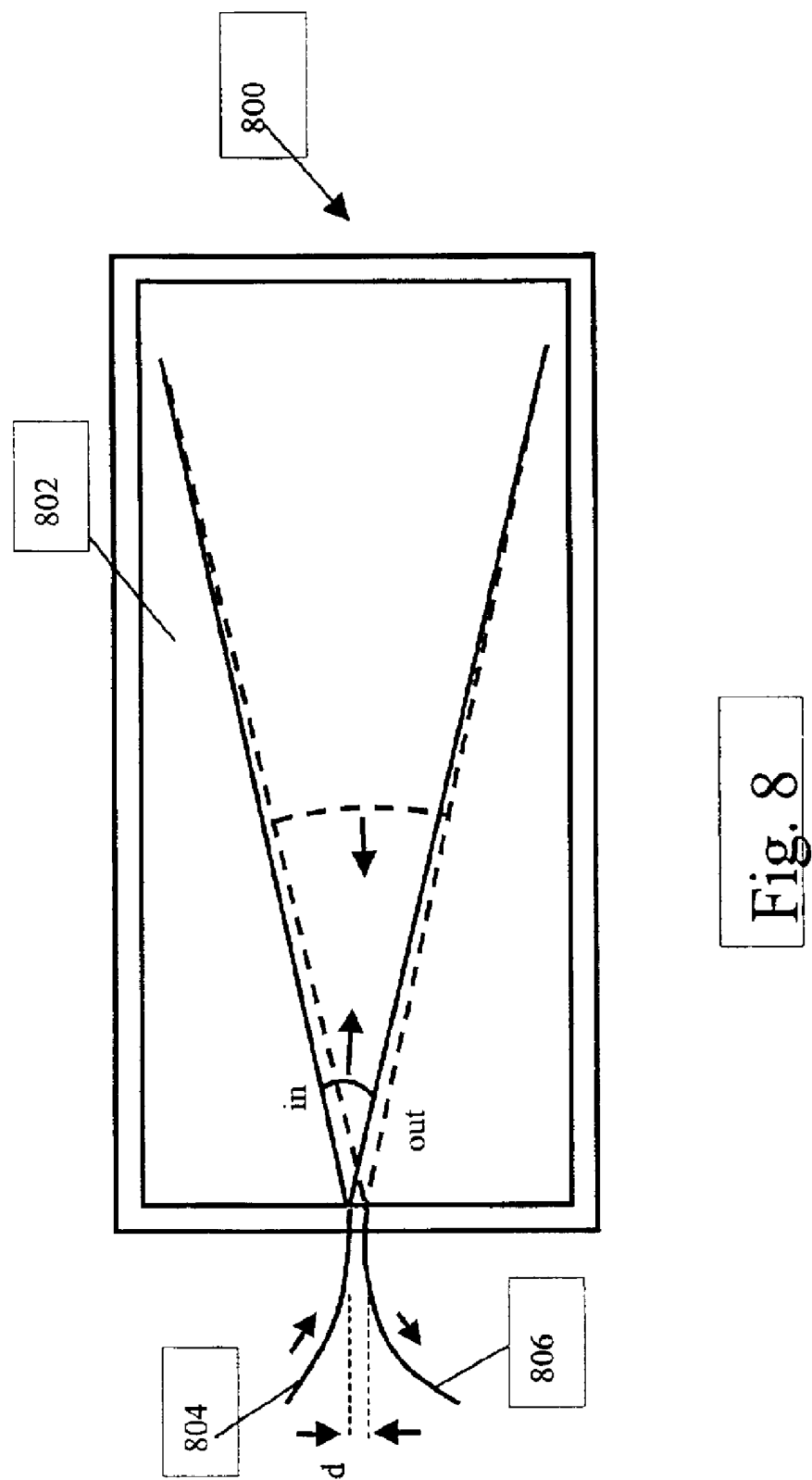
FIG. 8 shows a programmed planar holographic spectral filtering device with one input and one output, according to one embodiment of the invention.
Figure 9A:
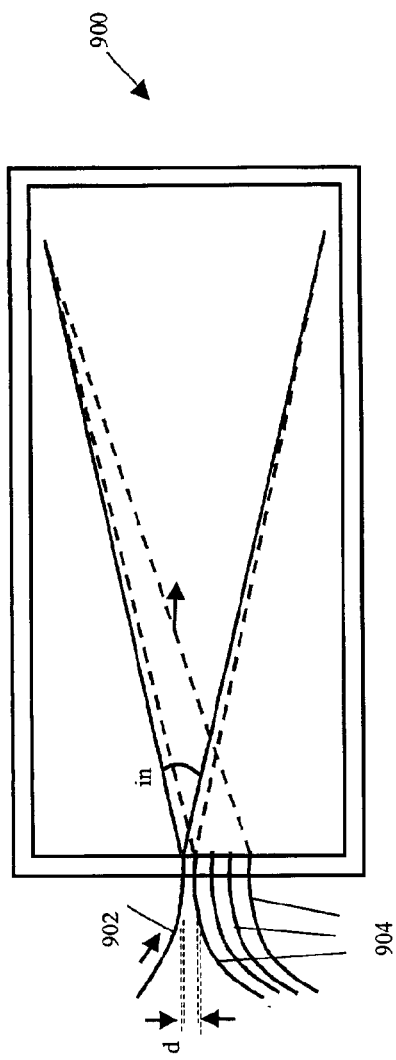
FIG. 9A shows a programmed planar holographic spectral filtering device with one input and multiple outputs, according to an embodiment of the invention.
Figure 9B:
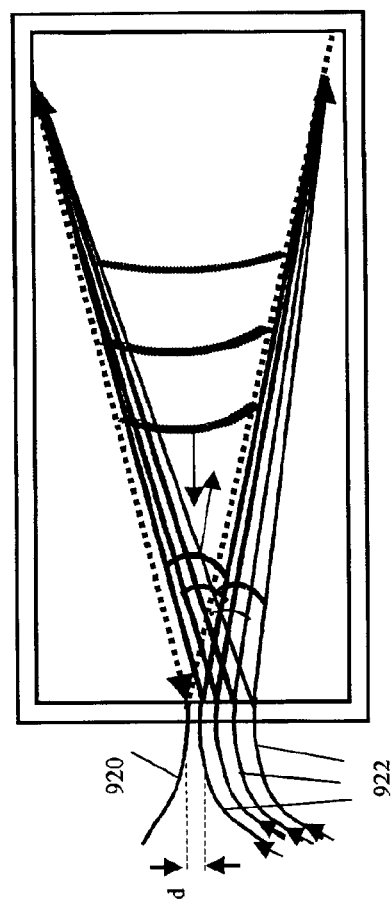
FIG. 9B shows a programmed planar holographic spectral filtering device with multiple inputs, according to an embodiment of the invention.

The programmed holographic structure, written on or within the planar substrate, diffracts the signals incident from one or more input ports to one or more output ports while simultaneously applying a programmed spectral transfer function. FIG. 8 shows an embodiment 800 of a planar programmed holographic processor, 802 with a single input port 804 and a single output port 806. An input optical signal expands from the fiber or waveguide input port 804 as shown. As it propagates, it is diffracted backwards and focused onto the output port 806. The back diffraction process acts further to apply the design spectral transfer function. The spacing between the input and output ports, d, is conveniently made as small as possible, with a typical separation of between about 25 to about 5000 microns. The output port 806 and the input port 804 do not have to be close, but placing them thusly provides for the highest spectral resolution possible for a fixed device length L. For a device length of L, the spectral resolution available with closely spaced input and output ports is roughly $v_s/2L$, where $v_s$ is the speed of light in the utilized z-modes of the holographic substrate. Spectral resolution is degraded by refractive index or thickness variations of the holographic substrate, unless compensated for in the design of the programmed holographic structure. Actual resolution from a device possessing uncompensated refractive index or thickness variations can be estimated by replacing the actual device size L in the formula above with an effective length given by the distance over which optical signals within the programmed holographic structure remain coherent with a reference wave that propagates at constant speed. In FIG. 9A a planar programmed holographic structure having an input 902 and multiple outputs 904 is shown. Each of a plurality of signals transmitted from an input 902 (there may be one or more than one signal sent to each output) to outputs 904 experiences a different transfer function. The configuration shown in FIG. 9A may serve as a wavelength-based or temporal-waveform-based demultiplexer; the configuration shown in FIG. 9B, may serve as a multiplexer having inputs 922 and an output 920.

In a programmed holographic device configured as a demultiplexer shown in FIG. 9A, the programmed holographic structure directs one or more specific wavelengths incident from the input port, to each of the output ports. The programmed holographic structure needed to do this comprises the sum of the structures that would individually map only specific wavelengths from the input port to one of the output ports, the holographic structure not appreciably interacting with those wavelengths not directed to that specific output port.

Figure 10:
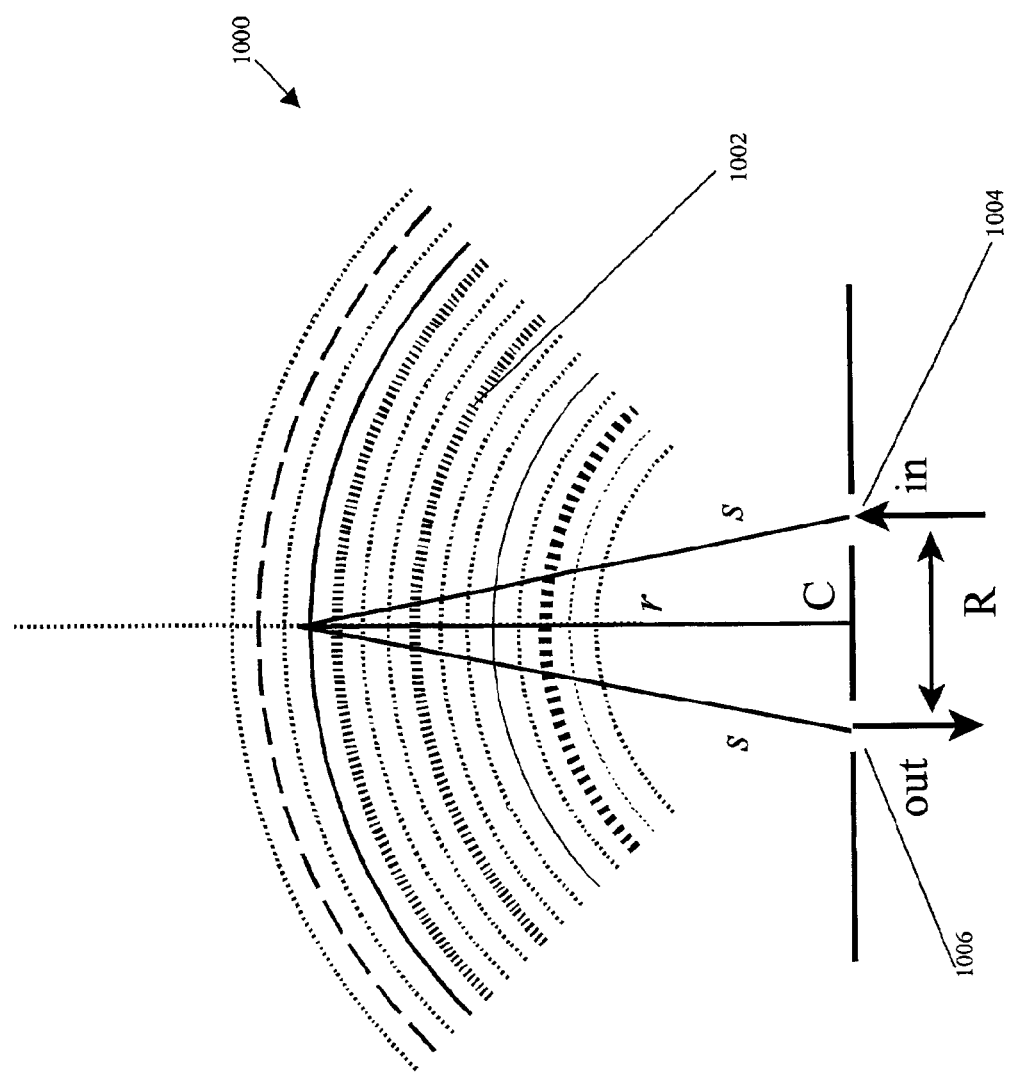
FIG. 10 shows a programmed planar holographic spectral filtering device according to one embodiment of the present invention, indicating the geometry of diffractive elements.

A programmed holographic structure that maps input signals from one input port to one output port is referred to as a primitive programmed holographic structure, or a primitive structure. The overall distributed diffractive (holographic) structure of a device which may map multiple input ports to multiple output ports, and is the sum of one or more primitive structures, is referred to its programmed holographic structure. The primitive programmed holographic structures may occupy spatial regions that are the same, partially overlapping, or non-overlapping. The output ports are typically positioned at respective conjugate image points to the input port. A pair of conjugate image points is defined by the relationship that certain spectral components of a signal emanating from one point are focused by the spatial transfer function of the programmed holographic structure to the conjugate image point; furthermore the two points act reciprocally, so that the same spectral components within a signal emanating from the second point are focused by the transfer function onto the first. Primitive programmed holographic structures comprising diffractive elements in the form of e.g., circular elliptical, parabolic or other focusing contours, can be employed to produce reciprocal focusing between conjugate points. FIG. 10 shows a set of diffracting elements 1002 which have circular contours, and conjugate points 1004, 1006. Owing to the general wavefront transformation capability of holographic structures, a wide range of input/output geometries can be accommodated. Rather than implementing programmed holographic structures that simply map signals from one point onto another and the reverse, it is possible to configure the programmed holographic structure so as to map an arbitrary input wavefront into an arbitrary output wavefront.

Figure 11:
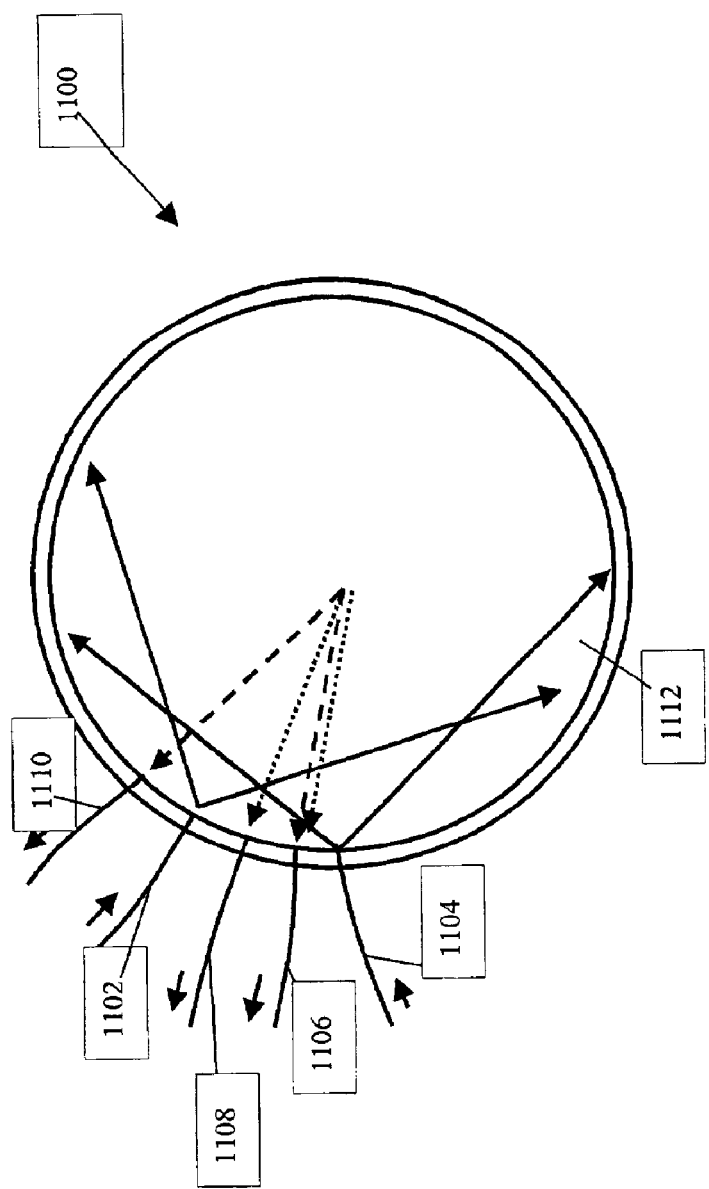
FIG. 11 shows a programmed planar holographic spectral filtering device with multiple inputs and outputs, according to an embodiment of the invention.

In FIG. 11, a planar-programmed holographic device 1100 with a different configuration is shown. In this configuration there are two inputs 1102, 1104, and three outputs 1106, 1108, 1110. The transfer function of the programmed holographic structure 1112 can be designed so that signals from the inputs 1102 and 1104 are directed at one or more of the outputs 1106, 1108, 1110, with each port-to-port connection having an individual spectral/temporal transfer function that may be the same or different than the others. Individual port-to-port connections are controlled by primitive programmed holographic structures.

Figure 12:
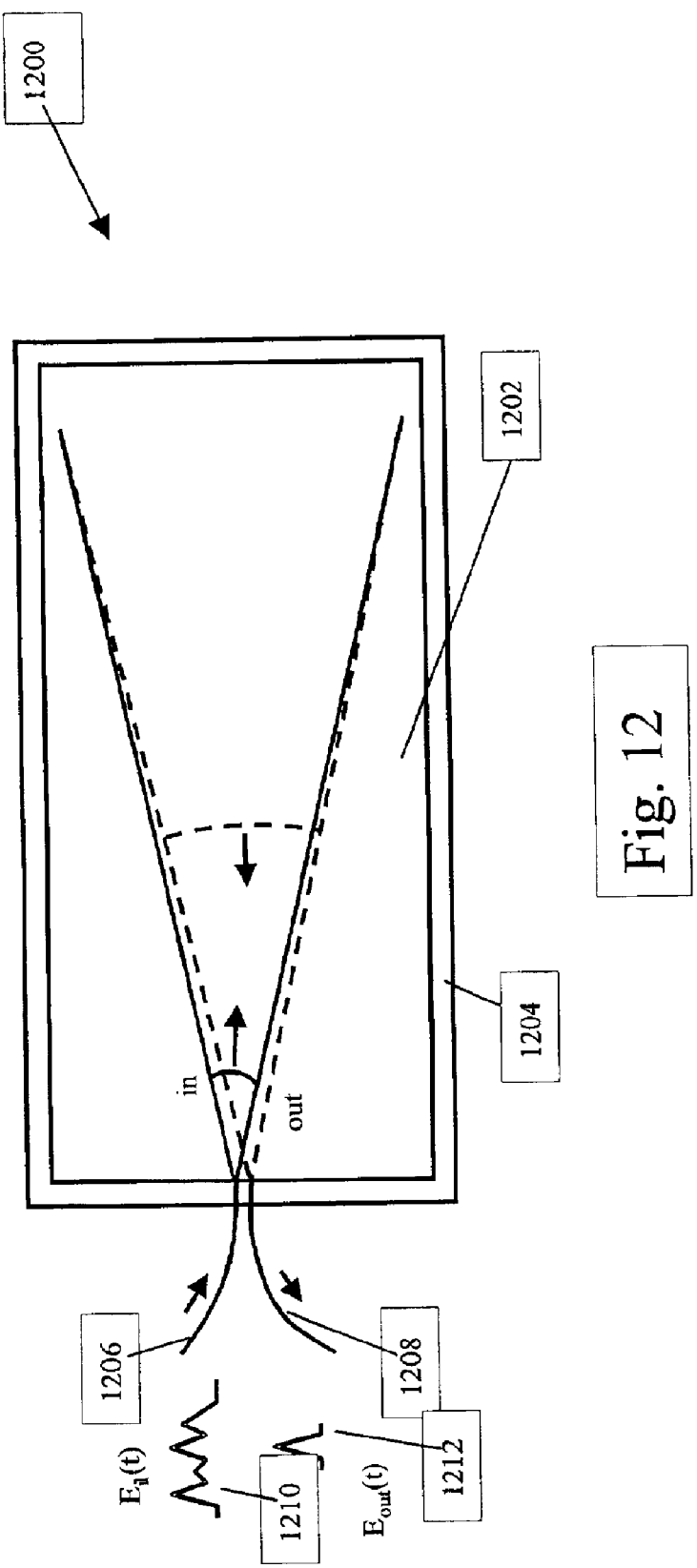
FIG. 12 shows a programmed holographic spectral filtering device configured as an optical waveform cross-correlator, according to one embodiment of the invention.

In FIG. 12, a programmed holographic device 1200 is shown, configured as an optical waveform cross-correlator. A holographic substrate 1202 is mounted to a support slab using an attachment strip 1204. An input fiber 1206 guides an input signal $E_f(t)$, having Fourier spectrum $E_f(\omega)$, into the holographic substrate to interact with the programmed holographic structure contained therein. An output signal 1212, $E_{out}(t)$ produced by back diffraction from the programmed holographic structure within or on the substrate, is fed into an output fiber 1208. The holographic structure 1200 is programmed so that its spectral transfer function is $E_d^*(\omega)$, where $E_d(\omega)$ is the Fourier transform of a design matching input signal $E_d(t)$. The output signal whose electric field is proportional to the integral, over the frequency $\omega$, of the product $E_d^*(\omega), \cdot E_f(\omega)$, represents the cross correlation of $E_f(t)$, where $E_d(t)$.

A primitive programmed holographic reflector/processor comprises a plurality of diffraction elements, each of which typically corresponds to a contour of constant index of refraction, a depth contour of a surface relief, or other physical element known in the art to produce diffracted signals. The spatial structure of the diffractive elements contains the programming information that allows it to map an input port to an output port, with a specific spectral transfer function.

Figure 13:
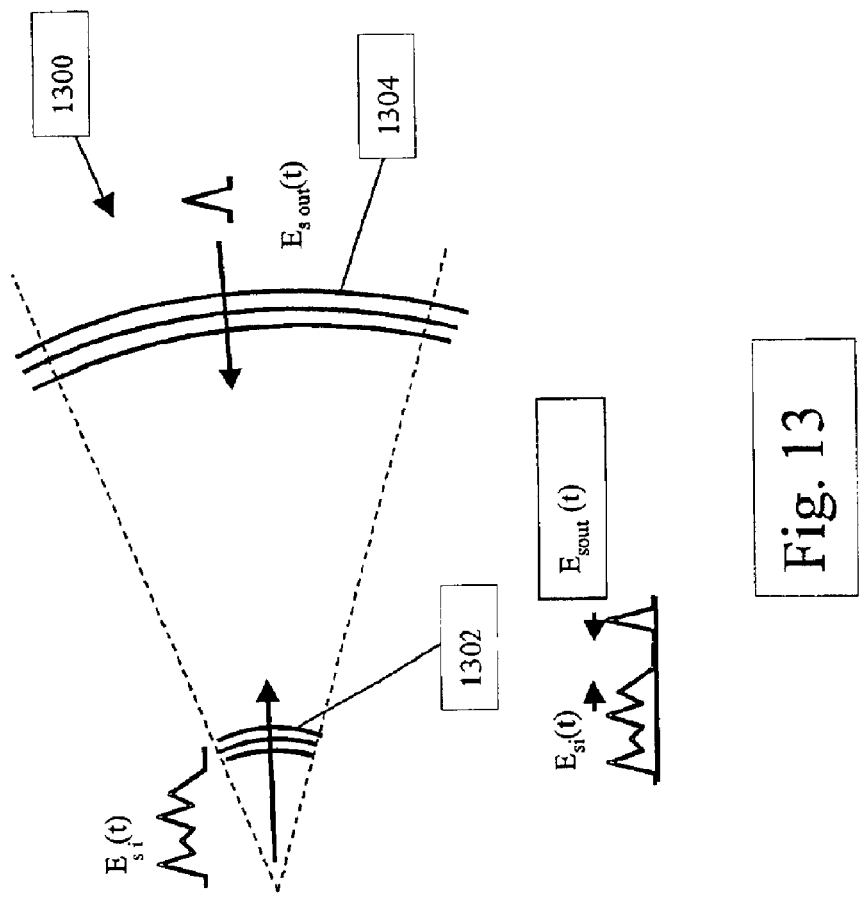
FIG. 13 illustrates a calculational method employing interference between a stimulated input and output signal pulse used in programmed according to an aspect of the invention.

The spatial structure of the diffractive elements needed to produce specific spectral transfer functions can be determined in a variety of ways. The spatial structure of a primitive programmed hologram can be calculated as an interference pattern generated by the collision of two optical pulses of appropriate spatial wavefront and temporal profile. As shown in FIG. 13, a simulated input pulse 1302 whose temporal shape is given by $E_{S1}(t)$, collides with a simulated output signal pulse 1304 whose temporal shape is given by $E_{sout}(t)$. The calculation models the propagation of the two pulses as they pass through each other, and the electric-field interference pattern that they produce. In one calculational approach, the simulated input pulse is launched from the location of the input port, with a spatial wavefront appropriate to emission from a point source. The simulated output pulse is launched toward the location of the output port so as to completely or partially overlap the path of the simulated input pulse, with a spatial wavefront that provides for aperture-limited, i.e., diffraction-limited, spot size at the location of the output port. The central wavevectors of the simulated input and output pulses make an angle relative to each other. This angle is preferably greater than 90 degrees and more preferably close to 180 degrees. The actual value of the angle is set by the constraints that the simulated pulses at least partially overlap and by the location of the input and output ports. In modeling the propagation of the simulated input and output pulses, variation of field amplitude is preferably suppressed. In the case of planar holographic devices, both simulated pulses propagate in the plane of the planar holographic substrate. In the case of bulk or three-dimensional devices, both pulses propagate through the bulk or three-dimensional substrate. If the primitive holographic structure is to be programmed to produce a spectral transfer function of the form $E_i^*(\omega)$, i.e. the complex conjugate of the Fourier transform of the real temporal function $E_i(t)$, the simulated input pulse is given the temporal waveform $E_i(t)$, i.e., $E_{S1}(t)=E_1(t)$, and the temporal waveform of the output pulse, $E_{sout}(t)$, is such that its total temporal duration is substantially shorter than the inverse of the overall spectral bandwidth of $E_i^*(\omega)$; equivalently, the simulated output pulse should have a temporal duration substantially shorter than the inverse of the overall spectral bandwidth of the simulated input pulse. One convenient form for the output temporal profile is a transform-limited brief pulse satisfying the bandwidth constraint cited above. Note that the evolution of the full electric field of each simulated pulse, i.e., carrier frequency plus envelope, is followed through the simulated propagation. The optical carrier frequency of the simulated output signal is made coincident with that of the simulated input signal. The common optical carrier frequency of the two simulated pulses controls the optical frequency at which the primitive programmed holographic structure is operative. The times at which the simulated input and output signals pass through their respective ports are controlled so that the two simulated pulses pass through each other, i.e., collide, while inside the physical boundaries of the holographic substrate. The holographic substrate will optimally have a physical length of at least $v_s\tau_1/2$, where $v_s$ is the speed of light in the substrate and $\tau_1$ is the temporal duration of the simulated input pulse in order to best record the programming structure. The electric field interference pattern calculated as the two simulated pulses collide, is mapped to variations in index of refraction, surface depth, or other parameter as might be appropriate to characterize the specific type of diffractive elements employed in the hologram design. To create a general transfer function $T(\omega)$, the calculation method described above is implemented with an simulated input signal having the spectrum $T^*(\omega)$ with the simulated output pulse chosen as above. The temporal profile of the general simulated input pulse is derived from $T^*(\omega)$ by Fourier transformation.

It may be useful to note that the impulse response, i.e., the temporal output waveform produced in response to a temporal delta function injected into the input port, of a primitive programmed holographic structure designed according to the method disclosed supra, is $E_i(-t)$, i.e. the time-reverse of the simulated input pulse.

As an alternative to the calculational procedure outlined above, the temporal waveforms of the simulated input and output pulses called out above may be interchanged. In this case, the spectral transformation produced by a primitive holographic structure programmed according to the calculated interference pattern with be $E_i(\omega)$, and the impulse response will be $E_i(t)$.

The wavefronts of the simulated input and output functions can be modified from the forms specified above to provide more efficient coupling of input signals to the output port employed. Let $E_{ir}(r)$, $E_{outr}(r)$, $E_{si}(r)$, and $E_{sout}(r)$ be, respectively, the spatial wave generated by the input port, the spatial wave optimally matched to the output port, the spatial wave used as the simulated input, and the spatial wave used as the simulated output. The parameter r represents the vector position within the holographic substrate. $E_{ir}(r)$ and $E_{outr}(r)$ are fixed by the port characteristics and the waveguide or medium to which they couple. The functions $E_{si}(r)$ and $E_{sout}(r)$ are preferably chosen so that the following equation is satisfied:

$$E_{outr}(r) = E_{ir}(r) \cdot E_{si}^*(r) \cdot E_{sout}(r).$$

There are multiple calculational methods known in the art for designing the spectral transfer functions of fiber Bragg gratings. These methods can be applied to the design of programmed holographic structures of the present invention, by taking appropriate slices perpendicular to the diffractive elements, and approximating the design problem as having a single dimension. This approach will be most useful when input and output ports are closely spaced.

Programmed holographic structures capable of providing multiple port-to-port mappings are calculated as the sum of multiple primitive programmed holographic structures, each of which supports a single port-to-port mapping. As stated above, the primitive structures may be entirely overlapping, partially overlapping or non-overlapping within the holographic substrate.

If the programmed holographic structures are to be fabricated by direct optical exposure of photosensitive holographic substrates, as in traditional holographic practice, the simulated signals described in the calculation method above correspond to the writing pulses needed. Writing may require large numbers of identical exposures, and may require full interferometric stability.

An important factor in the implementation of programmed holographic processors is the stabilization of their properties relative to changes in ambient temperature. The higher the spectral resolution demanded of programmed holographic devices, the greater will be the challenge of packaging them with adequate thermal stability. This is a common problem in optical devices which spectral response derives from physical structure. Great strides in thermal compensation have been made in the case of thin film and fiber grating devices. Many of those same compensation/stabilization methods can be applied to programmed holographic spectral filtering devices. Alternatively, simple reference diffractive structures can be designed into the devices, whose output provides a feedback key for active stabilization of the devices to the frequencies of input optical signals, or to reference optical signals.

Having illustrated and described the principles of the invention in the above-described embodiment, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

What is claimed is:

1. An optical apparatus, comprising:
   a substrate that propagates optical signals in at least two dimensions, the substrate having a first port and a second port;
   a plurality of diffractive elements within the substrate, the plurality of diffractive elements being arranged such that
      the plurality of diffractive elements exhibit a positional variation in at least one of amplitude, optical separation, and spatial phase over some portion of the substrate,
      each of the plurality of diffractive elements individually provides reciprocal focusing between the first port and the second port, and
   when a first optical signal having a first spatial wavefront and a first temporal waveform is introduced into the substrate through the first port, the plurality of diffractive elements
      apply a transfer function to the first optical signal to produce a second optical signal having a second spatial wavefront and a second temporal waveform, wherein the first and second spatial wavefronts differ in at least spatial wavefront shape and the first temporal waveform differs from the second temporal waveform, and
      focus the second optical signal to exit the substrate through the second port.

2. The apparatus of claim 1 wherein the input optical signal includes an optical pulse.

3. The apparatus of claim 1, further comprising an input optical waveguide for introducing an input optical signal into the substrate through the first port.

4. The apparatus of claim 1, further comprising an output optical waveguide for receiving an output optical signal exiting the second port.

5. The apparatus of claim 1, wherein the optical device forms a temporal waveform cross-correlator.

6. The apparatus of claim 1, where each of the diffractive elements has a spherical contour and a center of curvature.

7. The apparatus of claim 6, wherein the centers of curvature of the diffractive elements are coincident.

8. The apparatus of claim 7, further comprising:
   an input waveguide, and
   an output waveguide,
   wherein the input optical signal originates from the input waveguide and the output optical signal converges to an output waveguide, with the respective input and output waveguides located at respective conjugate image points of the plurality of the diffractive elements whose centers of curvature are coincident.

9. The apparatus of claim 1 wherein the first port is separated from the second port by a distance equal to or less than about 5000 microns.

10. The apparatus of claim 1 wherein the first port is separated from the second port by a distance between about 5000 microns and about 25 microns.

11. The apparatus of claim 1 wherein a propagation direction of the input optical signal is not collinear to a propagation direction of the output optical signal.

12. The apparatus claim 1, wherein each portion of the first spatial wavefront contributes to the second optical signal.

13. The apparatus of claim 1, wherein the substrate resides within a planar optical waveguide, the first optical signal interacting with the plurality of diffractive elements while propagating within the planar waveguide, propagation of the first optical signal within the planar waveguide being substantially guided in at least one dimension by the planar waveguide.

14. The apparatus of claim 13, further comprising a channel waveguide positioned to introduce the first optical signal into an edge of the planar waveguide through the first port.

15. The apparatus of claim 13, further comprising a channel waveguide positioned to receive the second optical signal output from an edge of the planar waveguide through the second port.

16. The optical apparatus recited in claim 1, further comprising:
a second plurality of diffractive elements within the substrate, the second plurality of diffractive elements being arranged such that
the second plurality of diffractive elements exhibit a positional variation in at least one of amplitude, spatial separation, and spatial phase over some portion of the substrate,
each of the second plurality of diffractive elements provides reciprocal focusing between the first port and a third port to the substrate, and
when the first optical signal having the first spatial wavefront and the first temporal waveform is introduced through the first port, the second plurality of diffractive elements
apply a second transfer function to the first optical signal so as to produce a third optical signal having a third spatial wavefront and a third temporal waveform, wherein the first and third spatial wavefronts differ in at least spatial wavefront shape and the first temporal waveform differs from the third temporal waveform, and
focus the third optical signal to exit the substrate through the third port.

17. The apparatus of claim 16 wherein the first optical signal is an optical pulse.

18. The apparatus of claim 16, wherein the substrate resides within a planar optical waveguide, the first optical signal interacting with the plurality of diffractive elements while propagating within the planar waveguide, each of the first port, the second port and the third port being positioned at an edge of the planar waveguide, propagation of the first optical signal within the planar waveguide being substantially guided in at least one dimension by the planar waveguide.

19. The apparatus of claim 18, further comprising a channel waveguide positioned to introduce the first optical signal into the planar waveguide through the first port.

20. The apparatus of claim 18, further comprising a channel waveguide positioned so as to receive the second optical signal output from an edge of the planar waveguide through the second port.

21. The apparatus of claim 20, further comprising a second channel waveguide positioned so as to receive the third optical signal output from an edge of the planar waveguide through the third port.

22. The optical apparatus recited in claim 1, further comprising:
a second plurality of diffractive elements within the substrate, the second plurality of diffractive elements being arranged such that
the second plurality of diffractive elements exhibit a positional variation in at least one of amplitude, spatial separation, and spatial phase over some portion of the substrate,
each of the second plurality of diffractive elements provides reciprocal focusing between the second port and a third port to the substrate, and
when a third optical signal having a third spatial wavefront and a third temporal waveform is introduced through the third port, the second plurality of diffractive elements
apply a second transfer function to the third optical signal so as to produce the second optical signal having the second spatial wavefront and the second temporal wavefront, wherein the second and third spatial wavefronts differ in at least spatial wavefront shape and the second temporal waveform differs from the third temporal waveform, and
focus the second optical signal to exit the substrate through the second port.

23. The apparatus of claim 1, wherein the plurality of diffractive elements are arranged such that, when the transfer function is applied to the first optical signal to produce a second optical signal having a second spatial wavefront and a second temporal waveform, the first temporal waveform differs from the second temporal waveform in duration.

24. A method comprising:
receiving a first optical signal at a first port of an optical device, the first optical signal having a first temporal waveform and a first spatial wavefront;
diffracting the first optical signal via diffractive elements within the optical device, such that each diffractive element individually acts to provide reciprocal focusing between the first port and an output port of the optical device, so as to
apply a transfer function to the first optical signal to produce a second optical signal having a second temporal waveform and a second spatial wavefront that differs from the first temporal waveform and the first spatial wavefront; and
focus the diffracted optical signal to exit the optical device through the output port.

25. The method of claim 24, wherein the transfer function includes spatial transformation information.

26. The method of claim 25 wherein the second optical signal is spatially transformed from the first optical signal.

27. The method of claim 24 wherein the first optical signal has a first direction of propagation and the second optical signal has a second direction of propagation, and where the first direction of propagation is not collinear to the second direction of propagation.

28. The method of claim 24 wherein the first optical signal is an optical pulse.

29. The method of claim 24 wherein the transfer function includes spectral transformation information.

30. The method of claim 29 wherein the second optical signal is spectrally transformed from the first optical signal.

31. The method of claim 29, wherein the transfer function further includes spatial transformation information.

32. The method of claim 31 wherein the second optical signal is spectrally and spatially transformed from the first optical signal.

33. The method of claim 24, wherein the diffractive elements form temporal waveform cross-correlator.

34. The method of claim 24, the diffractive elements residing within a planar optical waveguide, the first optical signal interacting with the diffractive elements while propagating within the planar waveguide, the first port and the second port being positioned at an edge of the planar waveguide, propagation of the first optical signal within the planar waveguide being substantially guided in at least one dimension by the planar waveguide.

35. The method of claim 34, further comprising a channel waveguide positioned to introduce the first optical signal into the planar waveguide through the first port.

36. The method of claim 34, the second optical signal being diffracted to a channel waveguide positioned so as to receive the second optical signal from an edge of the planar waveguide through the second port.

37. The method recited in claim 24, wherein the first temporal waveform differs from the second temporal waveform in duration.

* * * * *